June 27, 1950        H. BOICE        2,512,914
FISH LURE
Filed Jan. 27, 1948
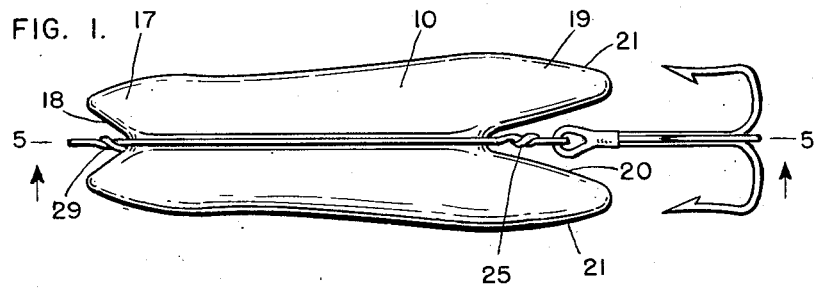
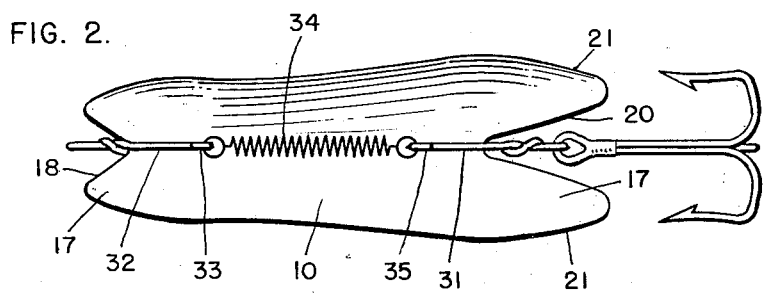
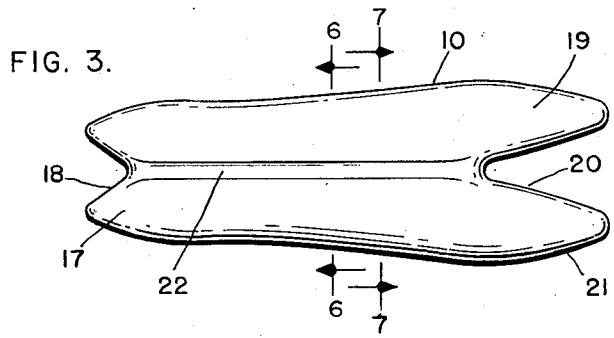
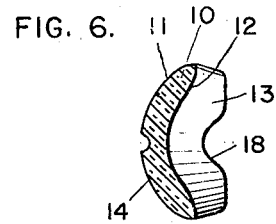
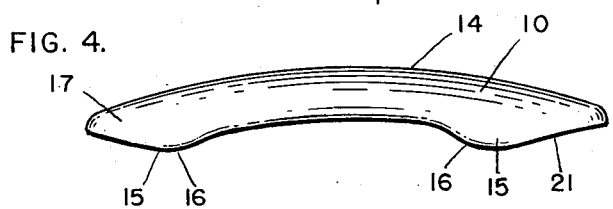
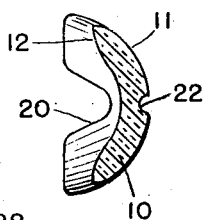
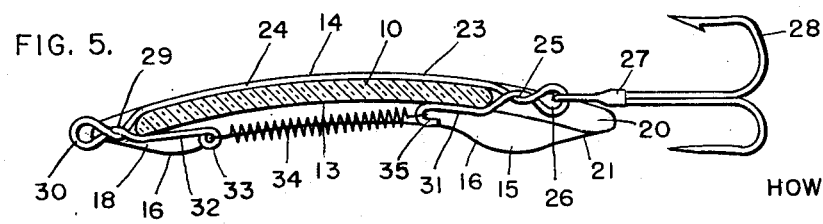
Inventor
HOWARD BOICE
Attorneys Patented June 27, 1950

2,512,914

UNITED STATES PATENT OFFICE 2,512,914

FISH LURE

Howard Boice, Newburgh, N. Y.

Application January 27, 1948, Serial No. 4,622

3 Claims. (Cl. 43—42.36)

The present invention relates to a new and improved fish lure particularly adapted for use in trolling or casting, and is an improvement over my copending application, Serial No. 628,152, filed November 13, 1945.

An important feature of the invention is to provide a fish lure having a body formed of light, and durable ceramic composition such as porcelain or the like, and which is provided with a glaze colored coating of high reflectivity and permanence. The body of the lure is longitudinally curved so as to be of concavo-convex shape in order to produce a more darting motion of the lure as it passes through the water. The sides of the body preferably adjacent the ends thereof are formed with depending edges which constitute oscillators or stabilizing means for preventing any tendency of the lure to turn over when being moved through the water or when casting and thus insure the body being maintained at all times on an even keel.

A further object consists in associating with the body of the lure, a removable spring harness that allows the harness to conform in shape with the curved body of the lure and also provides a direct connection between the hooks and the line so as to relieve the lure of strain and pressure to which the line and hooks may be subjected.

Other objects and advantages of the invention will become apparent from the following description when taken in conjunction with the accompanying claims and drawings.

Referring to the drawings in which is shown a preferred embodiment the invention may assume:

Figure 1 is a plan view of the body of the lure with the harness and hooks applied thereto.

Figure 2 is a bottom plan view of Figure 1.

Figure 3 is a detail plan view of the body of the lure with the harness removed.

Figure 4 is a side view of Figure 3.

Figure 5 is a longitudinal sectional view taken substantially along the line 5—5 of Figure 1.

Figure 6 is a sectional view taken substantially along the line 6—6 of Figure 3, and Figure 7 is a sectional view taken substantially along the line 7—7 of Figure 3.

Referring to the drawings in which like numerals indicate like parts in the several views, 10 designates the body of the lure which is preferably formed of suitable light, ceramic composition, such as porcelain or the like, and has a specific gravity between that of aluminum and any of the plastics, in order to give to the lure the necessary buoyancy so that it will not sink when it strikes the water and which imparts to the lure high compressive strength and hardness. The body 10 may vary in size and shape and is shown of elongated formation to give a fish-like appearance thereto. The ceramic composition used to form the body 10 may be regulated to produce different amounts of sealed pores with resulting changes in its specific gravity to obtain lures of different submergence characteristics so that the lures may be made within a wide range in order to be best suited for use under various fishing conditions. Thus, it will be seen that by varying or regulating the specific gravity of the composition used to form the lures, the specific gravity of the body 10 may be controlled to allow the lure to operate at the optimum distance either below the surface of the water or to remain on the surface of the water and in each instance, with a minimum of manipulation by the fisherman.

The body 10 is preferably glaze coated on its outer surface as at 11 (Fig. 6) in order to have a high reflectivity and permanence in a wide range of different colors. This glaze coating may be further applied to the bottom or underside of the lure as at 12 with metallic gold or platinum, by a suitable firing process that tends to enhance its wearing and non-tarnishing qualities. The ceramic glaze imparted to the body of the fish lure by the coating is of such a color or design as to attract the fish and may be formed of a coating of glass attached chemically to the ceramic or porcelain body.

The longitudinally curved body 10 is preferably of cupped or channeled shape to further assist its buoyancy and to produce a more darting motion in the water, and has a concave inner surface 13 (Fig. 5) and a convex outer surface 14. The sides of the body adjacent the ends thereof are provided with depending portions 15 which preferably are formed with curved edges 16 that constitute stabilizing means for preventing the lure from turning over and for insuring it being maintained on an even keel when trolling or casting.

The forward end or head 17 of the lure is centrally notched as at 18 and the rear end or tail 19 is formed with a deep substantially V-shaped slot 20 having outer inclined sides 21 which merge into the edges 16 of the stabilizing portions 15 (Fig. 5). The outer or upper surface of the lure has a longitudinally and centrally disposed groove 22 which extends between the notch 18 and the slot 20 so as to provide a seat for the harness 23. The harness 23 may be formed from a single piece of wire shaped to bend longitudinally and centrally around the body and has its upper portion 24 positioned within the groove 22 so as to be retained in a fixed position when applied to the body. The wire harness 23 is twisted at its rear end as at 25 (Fig. 5) to form a loop or eyelet 26 positioned in the slot 20 for receiving the shank 27 of the fish hooks 28. The opposite end portion of the harness 23 is twisted as at 29 to provide a loop 30 located in the notch 18 so as to receive one end of a fishing line. The opposed spaced end portions 31 and 32 of the wire harness 23 extend below the curved body 10, and one of these portions such as the portion 32 is formed with a loop 33 to which one end of a coil spring 34 is connected, while the other portion 31 of the harness is bent to provide a hook 35 which receives the opposite end of the coil spring 34 so as to detachably connect the harness to the body and permit the harness to be bent or conform in shape to the particular curvature of the body 10. When the parts are set up the harness 23 constitutes a direct connection between the hooks and the fishing line so as to relieve the body 10 of any pressure to which the line and hooks may be subjected. Moreover, by reason of the detachable connection of the harness with the lure body, the harness may be readily removed to allow replacement of the hooks or to connect the harness to another body. The spring 34 is housed within the curved body 10 (Fig. 5) between the stabilizing means or portions 15 so as to assume an out-of-the-way position and offer little resistance to the movement of the lure through the water.

The particular configuration of the body 10 coacts with the specific gravity of the ceramic composition used to form the body, to control or prevent the lure from sinking when it strikes the water and to control the degree of submergence of the lure into the water. The V-shaped slot 20 gives a fish-like or fly-like appearance to the lure and constitutes a guide for the shank 27 of the hooks for the purpose of conveying the hooks to the mouth of the striking fish in the shortest possible time and with the utmost accuracy to insure the fish being caught. The notch 18 at the forward end of the lure allows water to enter and flow through the concave shaped bottom of the body and forms a pocket for the loop 30 that attaches the harness to the fishing line. The longitudinal groove 22 provides a seat for the harness and is so positioned and shaped to offer a little obstruction to the motion of the lure through the water. The ceramic composition used to form the body 10 is such that it may be varied to produce different amounts of sealed pores with resulting changes in the specific gravity of the lure so that lures may be made of different submergence characteristics and in accordance with the particular kind of fish and water conditions with which the lure is to be used.

Manifestly, the body of the lure and the harness may be interchangeable with corresponding parts disclosed in my earlier application, Serial No. 628,152. Moreover, the form of the invention shown and described is merely illustrative and such changes may be made to the lure as come within the scope of the following claims.

I claim:

1. A fish lure of the class described including a longitudinally curved concavo-convex shaped body of ceramic composition, said body having spaced pairs of depending extensions at each end and on opposite sides thereof and constituting stabilizing means for maintaining the lure on an even keel, said body at its forward end having a notch and at its rear end a V-shaped slot, a detachable harness connected to the body and extending longitudinally and centrally thereof, said harness having means extending into the V-shaped slot for connecting a hook thereto, and means on said harness extending into said notch for connecting a fishing line to the harness.

2. A fish lure of the class described including a longitudinally curved concavo-convex shaped body of ceramic composition, said body having spaced pairs of depending extensions on opposite sides thereof provided with curved edges and constituting stabilizing means for maintaining the lure on an even keel, said spaced extensions on each side of the body being connected by longitudinally curved reduced portions, said body at its forward end having a notch and at its rear end a V-shaped slot, said body having a glazed coating on its inner and outer surfaces and provided with a central longitudinal groove on the upper side thereof, a detachable harness connected to the body and fitted in said groove, said harness having means extending into the V-shaped slot for connecting a hook thereto, and means on said harness extending into said notch for connecting a fishing line to the harness.

3. A fish lure of the class described including a longitudinally curved concavo-convex shaped body of ceramic composition, said body having spaced pairs of depending extensions on opposite sides thereof provided with curved edges and constituting stabilizing means for maintaining the lure on an even keel, said spaced extensions on each side of the body being connected by longitudinally curved reduced portions, and said body at its forward end having a notch and at its rear end a V-shaped slot.

HOWARD BOICE.

REFERENCES CITED

The following references are of record in the file of this patent:

UNITED STATES PATENTS

| Number | Name | Date |
| --- | --- | --- |
| 1,589,860 | Pealer | June 22, 1926 |
| 1,866,465 | Harrington et al. | July 5, 1932 |
| 2,019,959 | Frevent | Nov. 5, 1935 |
| 2,088,775 | Davenport | Aug. 3, 1937 |
| 2,238,604 | Sabin | Apr. 15, 1941 |